United States Patent
Lee et al.

(10) Patent No.: US 10,318,488 B2
(45) Date of Patent: Jun. 11, 2019

(54) DATA STORAGE SYSTEM HAVING DATA LOCKING AND UNLOCKING FUNCTIONS AND METHOD THEREFOR

(71) Applicant: AccelStor, Inc., Taipei (TW)

(72) Inventors: Yu-Ching Lee, Taipei (TW);
Kun-Cheng Lai, Taipei (TW);
Hann-Huei Chiou, Taipei (TW);
Pan-Lung Tsai, Taipei (TW)

(73) Assignee: ACCELSTOR LTD., Taipei (TW)

( * ) Notice: Subject to any disclaimer, the term of this patent is extended or adjusted under 35 U.S.C. 154(b) by 222 days.

(21) Appl. No.: 15/402,291

(22) Filed: Jan. 10, 2017

(65) Prior Publication Data

US 2018/0181586 A1 Jun. 28, 2018

(30) Foreign Application Priority Data

Dec. 22, 2016 (CN) .......................... 2016 1 1198804

(51) Int. Cl.
*G06F 21/56* (2013.01)
*G06F 16/176* (2019.01)
*G06F 16/13* (2019.01)

(52) U.S. Cl.
CPC .......... *G06F 16/1774* (2019.01); *G06F 16/13* (2019.01)

(58) Field of Classification Search
None
See application file for complete search history.

(56) References Cited

U.S. PATENT DOCUMENTS

| | | | | |
|---|---|---|---|---|
| 6,307,547 B1 * | 10/2001 | Bolnick | ................ | G06F 3/0482 715/775 |
| 2010/0305779 A1 * | 12/2010 | Hassan | ................... | G01C 17/38 701/2 |
| 2014/0068752 A1 * | 3/2014 | Choi | ........................ | G06F 21/36 726/16 |
| 2014/0137252 A1 * | 5/2014 | Zheng | ..................... | G06F 21/56 726/24 |
| 2016/0036965 A1 * | 2/2016 | Kim | ........................ | H04W 4/70 455/411 |
| 2016/0147988 A1 * | 5/2016 | Mutz | ...................... | H04L 63/107 726/17 |

* cited by examiner

*Primary Examiner* — Wilson Lee
(74) *Attorney, Agent, or Firm* — McClure, Qualey & Rodack, LLP

(57) ABSTRACT

A data storage system having data locking and unlocking functions and a method therefor are provided. The data locking and unlocking method includes: when a used capacity of a storage device is equal to or greater than a first threshold, locking a plurality of folders of the foregoing storage device; preventing the folders from being unlocked when the used capacity is greater than or equal to a second threshold; unlocking the locked folders according to a first unlock signal when the used capacity is less than the first threshold; and unlocking the locked folders according to a second unlock signal when the used capacity is between the first threshold and the second threshold. The foregoing second threshold is greater than the first threshold.

12 Claims, 3 Drawing Sheets

DATA STORAGE SYSTEM HAVING DATA LOCKING AND UNLOCKING FUNCTIONS AND METHOD THEREFOR

CROSS-REFERENCE TO RELATED APPLICATION

This non-provisional application claims priority under 35 U.S.C. § 119(a) to Patent Application No. 201611198804.2 filed in China, P.R.C. on Dec. 22, 2016, the entire contents of which are hereby incorporated by reference.

BACKGROUND

Technical Field

The present invention relates to a data storage system, and in particular, to a data storage system having data locking and unlocking functions and a method therefor.

Related Art

In the know technologies, storable space of an information storage system is limited. With the constant increase of data that needs to be stored, the storable space of the information storage system needs to be increased by means of a capacity expansion technology. Capacity expansion technologies of data storage systems may be divided into scale-up and scale-out.

The scale-up can complete capacity upgrade by increasing storage capacity based on existing storage systems, so as to meet the requirement of data increase. Therefore, the advantage of the scale-up technology lies in that only storage medium devices need to be increased, and costs of capacity expansion thereof do not linearly increase, but the disadvantage thereof lies in limited expansibility; a processing capacity of a system cannot be increased with the capacity increase, and expansion cannot be continued once hardware limitation of the system is exceeded. On the other aspect, the scale-out is generally in units of nodes, and capacity and performance of an information storage system can be synchronously increased, and the scale-out cannot be based on an existing storage system, and an architecture thereof needs to additionally add other devices, for example, devices added to expand a network connection capability. Therefore, the problem of network speed and data synchronization needs to be further considered after other devices are added. In this way, costs are increased greatly.

In addition to hardware expansion, a data storage system generally further collocates different algorithms to delay time when storage space reaches an upper limit, for example, collocates a data compression technology or a deduplication technology. However, the storage space will be exhausted regardless of hardware or software, and finally, a user of the information storage system needs to delete data in cooperation, so as to solve the fundamental problem thereof.

SUMMARY

In view of the above, the present invention provides a data storage system having data locking and unlocking functions and a method therefor.

In an embodiment, a data storage system having data locking and unlocking functions includes a storage device, a blocking module, and a trigger module. The storage device has a file system, which includes a plurality of folders. The blocking module is configured to lock the foregoing folders when a used capacity of the storage device is equal to or greater than a first threshold, and prevent the locked folders from being unlocked when the used capacity is greater than or equal to a second threshold, and unlock the locked folders according to a first unlock signal when the used capacity is less than the first threshold. The trigger module is configured to receive a second unlock signal, and unlock the locked folders according to the second unlock signal when the used capacity is between the first threshold and the second threshold. The foregoing second threshold is greater than the first threshold.

In an embodiment, the foregoing first threshold is a default value at a first time point, and is an adjusted value at a second time point later than the first time point, and the adjusted value is greater than the default value and less than the second threshold; when the used capacity is equal to or greater than the default value, the blocking module locks the folders; when the used capacity is less than the adjusted value, the blocking module unlocks the locked folders according to the first unlock signal.

In an embodiment, the foregoing second unlock signal is from an input and output device; the data storage system further includes a monitoring module, configured to monitor the used capacity; when the used capacity is less than the first threshold, the monitoring module generates the first unlock signal.

In an embodiment, the data storage system further includes a display device, configured to selectively display a first message, a second message, or a third message according to the used capacity; when the used capacity is greater than the second threshold, the display device displays the first message; when the used capacity is between the first threshold and the second threshold, the display device displays the second message; and when the used capacity is less than the first threshold, the display device displays the third message.

In an embodiment, the foregoing blocking module further includes a timer, configured to perform timing to generate a count value when the used capacity is between the first threshold and the second threshold and when the used capacity is greater than the second threshold; when the count value reaches a preset time at least once and the folders are not locked, the blocking module locks the folders and prevents the trigger module from unlocking the locked folders according to the second unlock signal.

In an embodiment, the foregoing folders are stored in a physical block of the storage device; the data storage system further includes a file deletion module; when the count value reaches the preset time at least once, the file deletion module deletes the locked folders after the locked folders are copied into another physical block.

In an embodiment, a data locking and unlocking method includes: when a used capacity of a storage device is equal to or greater than a first threshold, locking a plurality of folders of the foregoing storage device; preventing the folders from being unlocked when the used capacity is greater than or equal to a second threshold; unlocking the locked folders according to a first unlock signal when the used capacity is less than the first threshold; and unlocking the locked folders according to a second unlock signal when the used capacity is between the first threshold and the second threshold. The foregoing second threshold is greater than the first threshold.

In an embodiment, the data locking and unlocking method further includes: after the used capacity is equal to or greater than the first threshold, adjusting the first threshold, so that the used capacity is less than the adjusted first threshold and less than the second threshold.

In an embodiment, the step of unlocking the locked folders according to the second unlock signal is to unlock the locked folders according to the second unlock signal from an input and output device; the step of unlocking the locked folders according to the first unlock signal includes: monitoring the used capacity; and generating the first unlock signal when the used capacity is less than the first threshold value.

In an embodiment, the data locking and unlocking method further includes: displaying a first message when the used capacity is greater than the second threshold; displaying a second message when the used capacity is between the first threshold and the second threshold; and displaying a third message when the used capacity is less than the first threshold.

In an embodiment, the step of locking the folders when the used capacity is equal to or greater than the first threshold includes: performing timing to generate a count value when the used capacity is between the first threshold and the second threshold and when the used capacity is greater than the second threshold; and when the count value reaches a preset time at least once and the folders are not locked, locking the folders and preventing the locked folders from being unlocked.

In an embodiment, the foregoing folders are stored in a physical block of the storage device; the step of locking the folders when the used capacity is equal to or greater than the first threshold further includes: when the foregoing count value generated when the used capacity is between the first threshold and the second threshold and greater than the second threshold reaches the preset time at least once, deleting the locked folders after the locked folders are copied into another physical block.

Based on the above, according to an embodiment of the data storage system having data locking and unlocking functions and the method therefor of the present invention, the blocking module can lock files stored in the storage device when a used capacity of the storage device reaches a threshold, so that a user cannot add files or modify files in folders, and has to delete files to reduce the used capacity of the storage device.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
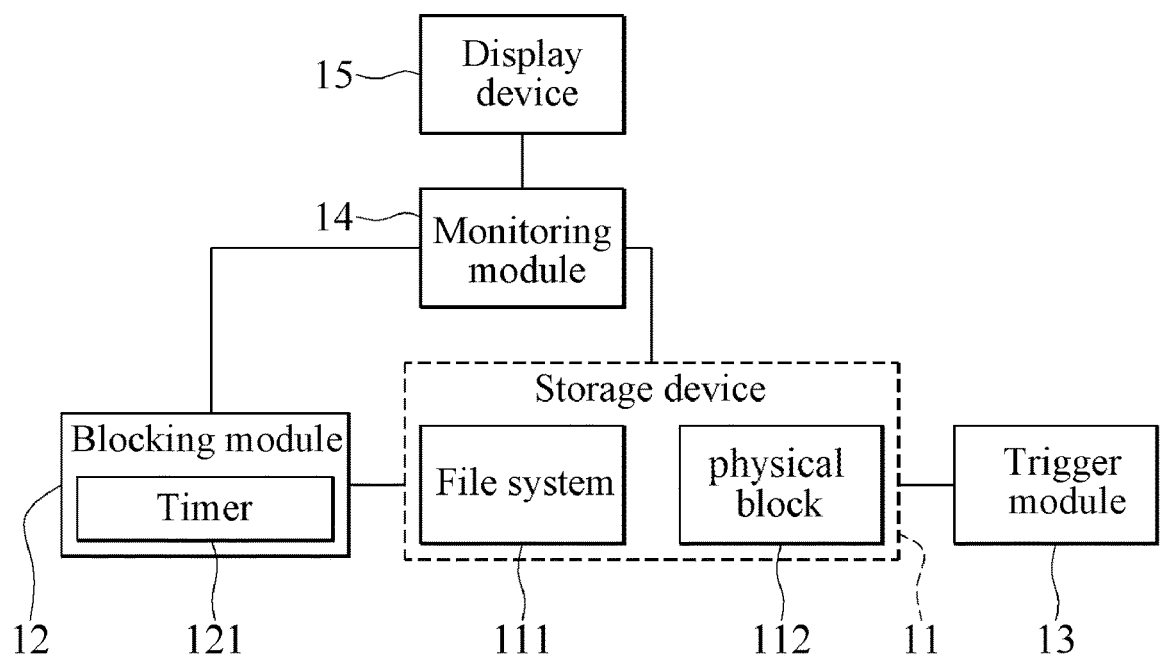
FIG. 1 is a functional block diagram of an embodiment of a data storage system having data locking and unlocking functions according to the present invention.
Figure 2:
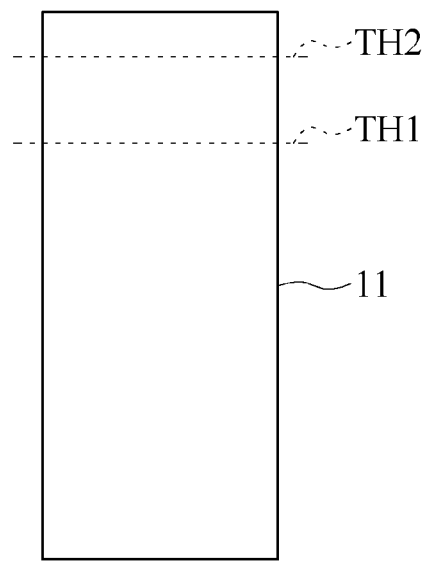
FIG. 2 is a schematic diagram of an embodiment of a used capacity of a storage device 11 of FIG. 1.

FIG. 1 is a functional block diagram of an embodiment of a data storage system having data locking and unlocking functions according to the present invention. FIG. 2 is a schematic diagram of an embodiment of a used capacity of a storage device 11 of FIG. 1. Refer to FIG. 1 and FIG. 2 together. The data storage system includes the storage device 11, a blocking module 12, a trigger module 13, a monitoring module 14, and a display device 15. The monitoring module 14 is separately coupled to the blocking module 12, the display device 15, and the storage device 11. The blocking module 12 and the trigger module 13 are separately coupled to the storage device 11. In an embodiment, the blocking module 12, the trigger module 13, and the monitoring module 14 may be implemented by using a central processing unit (CPU), a micro control unit (MCU), or an application-specific integrated circuit (ASIC).

The storage device 11 includes a file system 111. The file system 111 includes a plurality of folders. The folders correspond to a physical block 112 of the storage device 11. That is, the folders may include files stored in the physical block 112. A user of the storage device 11 may add files to the folders, delete files from the folders, or modify files. However, the folders occupy storable space of the storage device 11. According to increase and decrease of files, the storage device 11 may have different used capacities at different time points. For example, the used capacities of the storage device 11 may be 60%, 90%, even 95% of the storable space.

To prevent the user from constantly adding files to cause an under capacity of the storage device 11, the blocking module 12 is configured to lock the folders when the used capacity of the storage device 11 is equal to or greater than a first threshold TH1. The locked folders are read-only, and the user cannot add files or modify files in the folders. However, in this case, the user can manually delete the files, so that the files stored in the storage device 11 are reduced. When the used capacity of the storage device 11 is less than the first threshold TH1, the blocking module 12 unlocks the locked folders according to an unlock signal (called a first unlock signal below), so that the folders are converted from read-only to readable and writable, and the user can add files or modify files in the folders.

On the other aspect, after the blocking module 12 locks the folders when the used capacity of the storage device 11 is equal to or greater than the first threshold TH1, the user may manually unlock the folders. In detail, the trigger module 13 is configured to receive an unlock signal (called a second unlock signal below). When the used capacity of the storage device 11 is equal to or greater than the first threshold TH1, the trigger module 13 can unlock the locked folders according to the second unlock signal, so that state of the folders is converted from read-only to readable and writable, and the user can continue to add files or modify files in the folders. In an embodiment, the user can generate the second unlock signal by means of an input and output device (I/O device), for example, a keyboard or a mouse, so as to control the trigger module 13 to unlock the locked folders.

However, after the trigger module 13 unlocks the folders, if the user add files or add content of original files in the storage device 11 to make the used capacity of the storage device 11 equal to or greater than a second threshold TH2, in this case, to keep operating space in the storage device 11 for the system to operate, the blocking module 12 re-locks the folders. In addition, in this case, the blocking module 12 prevents the locked folders from being unlocked and makes the folders maintain read-only state. Then, the user cannot unlock the locked folders by means of the trigger module 13, and the user only can delete the files. When the user deletes the files to make the used capacity less than the second threshold TH2 and greater than or equal to the first threshold value TH1, the user can unlock the locked folders by means of the trigger module 13; or, when the user deletes the files to make the used capacity less than the first threshold TH1, the blocking module 12 unlocks the locked folders according to the first unlock signal.

In an embodiment, the monitoring module 14 is configured to monitor the used capacity of the storage device 11 and generate a lock signal or the first unlock signal on such basis. When the used capacity is greater than or equal to the first threshold TH1, the monitoring module 14 generates the lock signal, so that the blocking module 12 receives the lock signal and locks the folders according to the lock signal; when the used capacity is less than the first threshold TH1 and the folders are locked, the monitoring module 14 generates the first unlock signal, so that the blocking module 12 unlocks the folders according to the first unlock signal.

In an embodiment, the first threshold TH1 and the second threshold TH2 may be indicated by percentages. The first threshold TH1 may be 90% of storage capacity of the storage device 11; the second threshold TH2 may be 95% of the storage capacity of the storage device 11; when the used capacity is equal to or greater than 90% of the storage capacity, the blocking module 12 locks the folders; when the used capacity is equal to or greater than 95% of the storage capacity, the blocking module 12 locks the folders, and in this case, the blocking module 12 prevents the trigger module 13 from unlocking the folders; however, when the used capacity is less than 90% of the storage capacity, the blocking module 12 unlocks the locked folders. In some other embodiments, the first threshold TH1 and the second threshold TH2 may be other percentages, and the present invention is not limited thereto.

In an embodiment, when the blocking module 12 locks the folders when the used capacity is between the first threshold TH1 and the second threshold TH2, the user can unlock the folders by adjusting the first threshold TH1. In detail, the first threshold TH1 may be a default value or an adjusted value; the first threshold TH1 is a preset time at a first time point before the folders are locked; after the folders are locked by the blocking module 12, the user can manually adjust the first threshold TH1, so that the first threshold TH1 is an adjusted value at a second time point after the folders are locked, and the adjusted value is greater than the default value and less than the second threshold TH2. By using that the foregoing first threshold TH1 may be 90% as an example, in this embodiment, the default value may be 90%, and the adjusted value may be 92%; when the used capacity is 91%, the used capacity is between the default value and the adjusted value, and the blocking module 12 locks the folders; after the folders are locked, the user can modify the first threshold TH1 as 92%, so that the first threshold TH1 is the adjusted value: 92%. Therefore, the used capacity: 91% is less than the adjusted first threshold TH1: 92%; the blocking module 12 unlocks the folders according to the unlock signal from the monitoring module 14, so that the user adds files or modifies files in the folders. In other embodiments, the adjusted value may also be other values greater than 90% and less than 95%.

In an embodiment, the data storage system further includes the display device 15, coupled to the monitoring module 14. The display device 15 may be a screen, and the display device 15 can selectively display different messages according to the used capacity. For example, when the used capacity is greater than the second threshold value TH2, the display device 15 can display a first message; when the used capacity is between the first threshold TH1 and the second threshold TH2, the display device 15 can display a second message different from the first message; and when the used capacity is less than the first threshold TH1, the display device 15 can display a third message different from the first message and the second message. The first message, the second message, and the third message may be patterns or text, and the user can know the current used capacity of the storage device 11 according to the patterns or text displayed by the display device 15, and can determine, on such basis, whether to delete or back up the files.

In an embodiment, the blocking module 12 includes a timer 121, which is configured to perform timing to generate a count value that indicates time when the used capacity is between the first threshold TH1 and the second threshold TH2 and when the used capacity is greater than the second threshold TH2; when the count value reaches a preset time at least once and the folders are not locked, the blocking module 12 locks the folders. For example, by using that the preset time is 10 min as an example, when the count value reaches 10 min at least once, the blocking module 12 locks unlocked folders. However, the foregoing number of times can be designed according to requirements, for example, twice, or even more than three times. In addition, after the count value reaches the preset time at least once, the blocking module 12 prevents the trigger module 13 from unlocking the locked folders according to the second unlock signal, so as to force the user to delete or back up the files.

Figure 3:
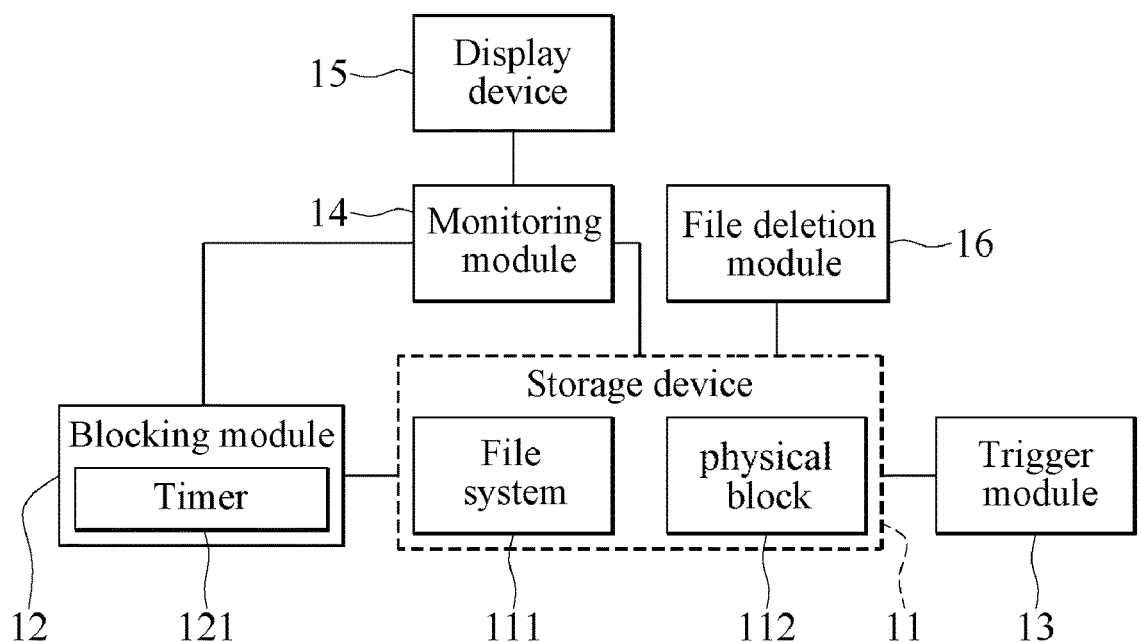
FIG. 3 is a functional block diagram of another embodiment of a data storage system having data locking and unlocking functions according to the present invention.

FIG. 3 is a functional block diagram of another embodiment of a data storage system having data locking and unlocking functions according to the present invention. Referring to FIG. 3, the data storage system further includes a file deletion module 16, coupled to a storage device 11. In this embodiment, folders in the storage device 11 are stored in a physical block 112; when a count value generated by a timer 121 reaches a preset time at least once, the file deletion module 16 can automatically copy all folders in the physical block 112 into another physical block, for example, another physical block for backup in the storage device, so as to back up data, and delete all data in the physical block 112 after the folders are copied; or, the file deletion module 16 can also delete all data in the physical block 112 after a user copies all folders in the physical block 112 into another physical block; or, the file deletion module 16 can also directly delete all data in the physical block 112 without backup after the count value generated by the timer 121 reaches the preset time at least once.

Based on the above, according to an embodiment of the data storage system having data locking and unlocking functions and the method therefor of the present invention, the blocking module can lock files stored in the storage device when a used capacity of the storage device reaches a threshold, so that a user cannot add files or modify files in folders, and has to delete files to reduce the used capacity of the storage device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A data storage system having data locking and unlocking functions, comprising:
   a hardware processor;
   a storage device, having a file system, wherein the file system comprises a plurality of folders; and a processing circuit, coupled to the storage device, the processing circuit includes:
a blocking circuit, configured to lock the folders when a used capacity of the storage device is equal to or greater than a first threshold, and prevent the locked folders from being unlocked when the used capacity is greater than or equal to a second threshold, wherein the second threshold is greater than the first threshold, and unlock the locked folders according to a first unlock signal when the used capacity is less than the first threshold; and
a trigger circuit, configured to receive a second unlock signal, and unlock the locked folders according to the second unlock signal when the used capacity is between the first threshold and the second threshold;
wherein after the trigger circuit unlocks the locked folders, when the used capacity of the storage device equal to or greater than the second threshold, the blocking circuit re-locks the folders and prevents the re-locked folders from being unlocked.

2. The data storage system having data locking and unlocking functions according to claim 1, wherein the first threshold is a default value at a first time point, and is an adjusted value at a second time point later than the first time point, and the adjusted value is greater than the default value and less than the second threshold; when the used capacity is equal to or greater than the default value, the blocking circuit locks the folders; when the used capacity is less than the adjusted value, the blocking circuit unlocks the locked folders according to the first unlock signal.

3. The data storage system having data locking and unlocking functions according to claim 2, wherein the second unlock signal is from an input and output device; the data storage system further comprises a monitoring circuit, configured to monitor the used capacity; when the used capacity is less than the first threshold, the monitoring circuit generates the first unlock signal.

4. The data storage system having data locking and unlocking functions according to claim 1 further comprises a display device, configured to selectively display a first message, a second message, or a third message according to the used capacity; when the used capacity is greater than the second threshold, the display device displays the first message; when the used capacity is between the first threshold and the second threshold, the display device displays the second message; and when the used capacity is less than the first threshold, the display device displays the third message.

5. The data storage system having data locking and unlocking functions according to claim 1, wherein the blocking circuit comprises a timer, configured to perform timing to generate a count value when the used capacity is between the first threshold and the second threshold and when the used capacity is greater than the second threshold; when the count value reaches a preset time at least once and the folders are not locked, the blocking circuit locks the folders and prevents the trigger circuit from unlocking the locked folders according to the second unlock signal.

6. The data storage system having data locking and unlocking functions according to claim 5, wherein the folders are stored in a physical block of the storage device; the data storage system further comprises a file deletion circuit; when the count value reaches the preset time at least once, the file deletion circuit deletes the locked folders after the locked folders are copied into another physical block.

7. A data locking and unlocking method, comprising:
a processing circuit locking a plurality of folders of the storage device when a used capacity of a storage device is equal to or greater than a first threshold;
the processing circuit preventing the folders from being unlocked when the used capacity is greater than or equal to a second threshold, wherein the second threshold is greater than the first threshold;
the processing circuit unlocking the locked folders according to a first unlock signal when the used capacity is less than the first threshold;
the processing circuit unlocking the locked folders according to a second unlock signal when the used capacity is between the first threshold and the second threshold; and
after a trigger circuit unlocks the locked folders according to the second unlock signal, when the used capacity of the storage device equal to or greater than the second threshold, the processing circuit re-locking the folders and preventing the re-locked folders from being unlocked.

8. The data locking and unlocking method according to claim 7 further comprises: after the used capacity is equal to or greater than the first threshold, adjusting the first threshold, so that the used capacity is less than the adjusted first threshold and less than the second threshold.

9. The data locking and unlocking method according to claim 8, wherein the step of unlocking the locked folders according to the second unlock signal is to unlock the locked folders according to the second unlock signal from an input and output device; the step of unlocking the locked folders according to the first unlock signal comprises:
monitoring the used capacity; and
generating the first unlock signal when the used capacity is less than the first threshold value.

10. The data locking and unlocking method according to claim 7 further comprises:
displaying a first message when the used capacity is greater than the second threshold;
displaying a second message when the used capacity is between the first threshold and the second threshold; and
displaying a third message when the used capacity is less than the first threshold.

11. The data locking and unlocking method according to claim 7, wherein the step of locking the folders when the used capacity is equal to or greater than the first threshold comprises:
performing timing to generate a count value when the used capacity is between the first threshold and the second threshold and when the used capacity is greater than the second threshold; and
when the count value reaches a preset time at least once and the folders are not locked, locking the folders and preventing the locked folders from being unlocked.

12. The data locking and unlocking method according to claim 11, wherein the folders are stored in a physical block of the storage device; the step of locking the folders when the used capacity is equal to or greater than the first threshold further comprises: when the count value reaches the preset time at least once, deleting the locked folders after the locked folders are copied into another physical block.

* * * * *